United States Patent
Blackmore et al.

(10) Patent No.: US 6,668,223 B2
(45) Date of Patent: Dec. 23, 2003

(54) CROP WIDTH MEASURING APPARATUS

(75) Inventors: Simon Blackmore, Bedfordshire (GB); Richard J. Godwin, Bedfordshire (GB); David M. W. Pullen, Bedfordshire (GB); Paul N. Wheeler, Hertfordshire (GB)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/090,233

(22) Filed: Mar. 4, 2002

(65) Prior Publication Data

US 2002/0173893 A1 Nov. 21, 2002

(30) Foreign Application Priority Data

Mar. 8, 2001 (EP) .............................. 01105749

(51) Int. Cl.$^7$ .............................................. A01D 45/00
(52) U.S. Cl. ........................................ 701/50; 701/207
(58) Field of Search ........................ 701/50, 207, 213; 180/167, 168, 169; 348/120; 56/10.2 F, 10.2 C, 10.2 R

(56) References Cited

U.S. PATENT DOCUMENTS

| | | | |
|---|---|---|---|
| 4,918,441 A | * 4/1990 | Bohman | ..................... 340/901 |
| 5,524,424 A | 6/1996 | Halgrimson et al. | ..... 56/10.2 D |
| 5,606,504 A | 2/1997 | Andersen | ............... 364/424.07 |
| 5,995,894 A | * 11/1999 | Wendte | ....................... 701/50 |
| 6,192,664 B1 | * 2/2001 | Missotten et al. | ........ 56/10.2 R |

FOREIGN PATENT DOCUMENTS

| | | |
|---|---|---|
| DE | 40 41 995 A1 | 7/1992 |
| DE | 195 43 343 A1 | 5/1997 |
| EP | 0 960 557 A1 | 12/1999 |
| EP | 0 960 558 A1 | 12/1999 |

OTHER PUBLICATIONS

Abstract of Bezhetskselmash Wks; 13.01.76–SU–318231; (30.07.79); 1 page.

* cited by examiner

Primary Examiner—Michael J. Zanelli

(57) ABSTRACT

A crop width measuring assembly is mounted to a harvesting assembly of an agricultural machine for measuring the actual width of the crop swath received by the harvesting assembly. The crop width measuring assembly comprises a plurality of crop presence sensors distributed along the width of the harvesting assembly. The crop width measuring assembly is in communication with a processor for monitoring different crop parameters in relation to their geographic location in a field.

11 Claims, 4 Drawing Sheets

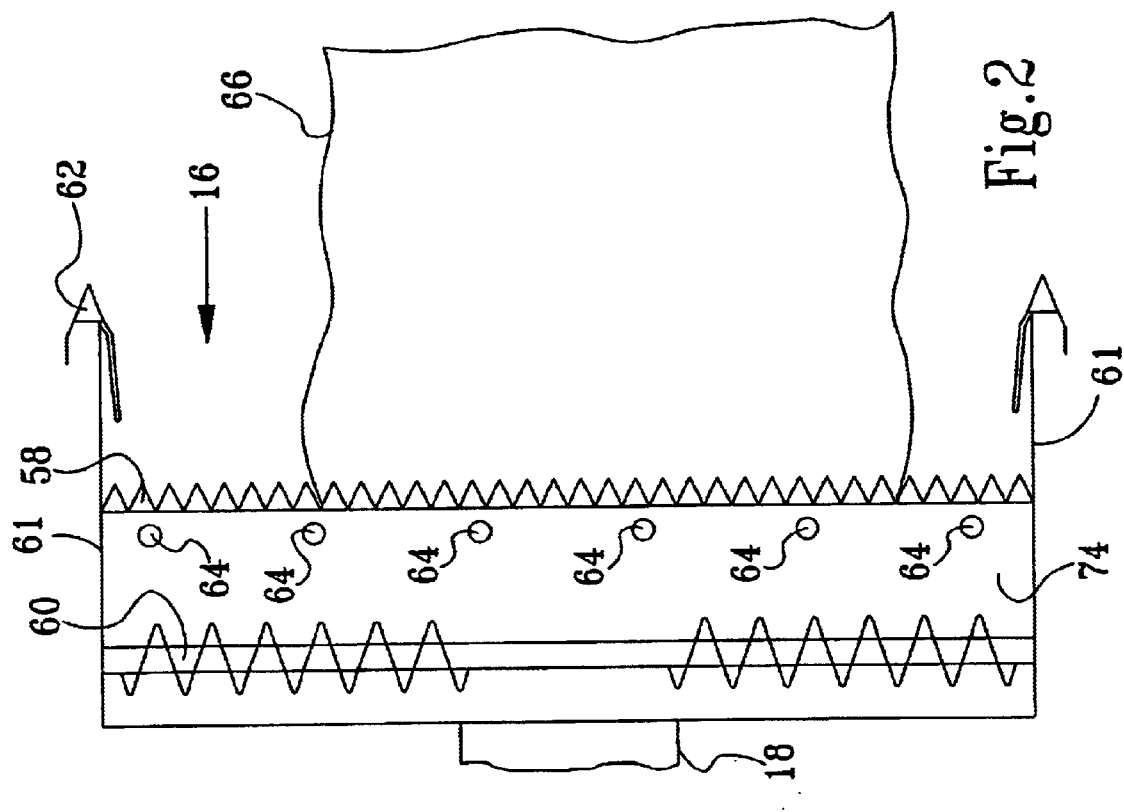
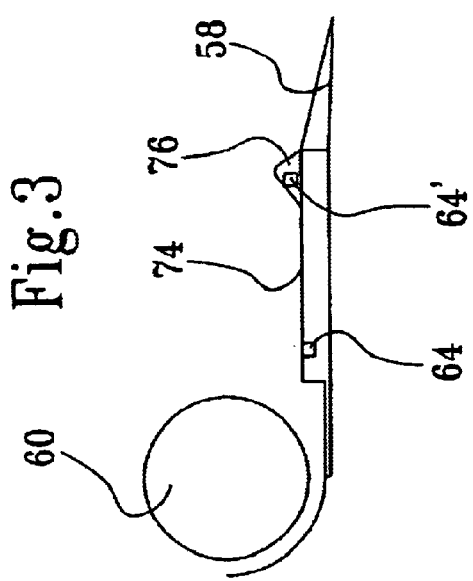

CROP WIDTH MEASURING APPARATUS

FIELD OF THE INVENTION

The present invention is directed to a crop width measuring assembly for measuring the width of crop received by a harvesting assembly of an agricultural machine.

BACKGROUND OF THE INVENTION

Crop management decisions are increasingly based on the information presented in yield maps. Thus, it is important that they are accurate and contain as few errors as possible. However, two systematic errors occur in existing methods of producing yield maps caused by difficulties in defining the start and end of cutting and knowing the crop width entering the agricultural machine. In order to produce error-free yield maps it is necessary to have an accurate and reliable method of detecting the start and end of harvesting and the width of newly harvested material entering the agricultural harvester.

One existing method of detecting the start and end of cutting is to monitor whether the harvesting assembly is raised or lowered (U.S. Pat. No. 5,524,424 A, EP 0 960 558 A). However, its accuracy depends on the operator's ability to lower and raise the table at a constant distance from the edge of the standing crop. Other methods have been used for measuring crop flow, but as currently conceived they are unreliable.

Some harvesters have a set of buttons that allow the operator to record the proportional width of the harvesting assembly being full of crop. If the operator does not use these buttons consistently and accurately, then it will cause further errors (S. Blackmore and M. Moore, Remedial Correction of Yield Map Data, Precision Agriculture, 1999, Kluwer, Vol. 1, pages 53–66).

An automatic measurement of the swath width by means of ultrasonic sensors and a determination of the effective harvest area from combine position data generated using GPS is discussed by K. Sudduth et al, Ultrasonic and GPS Measurement of Combine Swath Width, ASAE Annual International Meeting, Orlando, Fla., USA, 12–16 Jul. 1998, ASAE Paper No 983096.

In EP 0 960 558 A, a method for generating yield maps is proposed, in which the presence of crop to be harvested in front of a harvesting assembly is indicated by a sensor monitoring the position of the reel on the combine's harvesting platform. Additionally, ultrasonic distance sensors measure the width of the harvested crop swath. Thus, on both side ends of the harvesting assembly, ultrasonic distance sensors submit ultrasonic waves to the swath, and the swath width is determined based on the run time of the ultrasonic waves. This method does not work reliably when two swaths with a space between them are taken up. In addition, the ultrasonic sensors do not work when the crop is lodged.

DE 195 43 343 A discloses a baler in which the volume of received crop is measured by a capacitive sensor. DE 40 41 995 A proposes a forage harvester in which presence of crop throughput is detected by means of a capacitive sensor. According to the signal of the sensor, the rotational speed of the chopping drum of the forage harvester is controlled, or conservation chemicals are added to the harvested crop.

SUMMARY OF THE INVENTION

It is an object of the present invention to provide an apparatus for establishing a yield map having improved precision and reliability.

To accomplish this objective, a number of crop presence sensors are distributed over the width of a harvesting assembly of the agricultural machine. Preferably, the crop presence sensors are evenly distributed along the width of the harvesting assembly. It would also possible to have an uneven distribution. Each one of the crop presence sensors is capable of detecting whether crop is present in its detection range. The size of the detection range depends on the type of the crop presence sensor. It is possible to use crop presence sensors having a relatively large detection range, such as ultrasonic sensors covering a part of the width of the harvesting assembly, or to use crop presence sensors with a relatively small detection range. The latter only detect crop passing in their vicinity. According to the signals of the crop presence sensors, the crop width measuring assembly is operable to establish information regarding the width of the crop actually being received by the harvesting assembly. The actual swath width can be calculated by adding the width of the detection ranges of the crop presence sensors detecting crop (when the detection range is relatively large), or by multiplying the distance between adjacent sensors with the number of sensors detecting crop.

An advantage of the present invention is that cheaper and more reliable sensors can be used, since the distance between a sensor and the edge of the crop swath is not measured—like in the prior art, EP 0 960 558 A—but rather only the presence or absence of crop is detected. When the number of crop presence sensors is sufficiently high, the accuracy of the crop width measuring assembly is comparable with, or even higher than, the accuracy of known ultrasonic sensors for measuring swath width. Furthermore, the crop width measuring assembly according to the present invention is capable of detecting actual swath width when two swaths having a gap are received by the harvesting assembly.

Possible errors in the established swath width could be due to crop remaining in the detection range of the crop presence sensors. Such crop should not influence the information provided by the crop presence sensors. In order to resolve this problem, it is proposed to arrange the crop presence sensor such that moving crop removes (wipes) any stationary crop away from the crop presence sensors. This can be achieved when the outer surface of the crop presence sensor is located in the plane of the surface of the table of the harvesting assembly.

Alternatively or additionally, the signals from the crop presence sensors can be electronically processed by means of a signal processor to remove the effect of any stationary crop actuating the crop presence sensor. Thus, the output signal of the crop presence sensor can be time differentiated and afterwards submitted to a comparator or Schmidt-Trigger.

Capacitive sensors are preferably used as relatively cheap and compact crop presence sensors having a small detection range. They also work in conditions when crop is lodged.

The crop width measuring assembly of the present invention can be used in conjunction with a processor for collecting data concerning additional crop parameters. The processor is provided with a geographic position sensor, such as a GPS sensor and/or a speed sensor. In order to establish accurately the crop parameters with the geographic location, information regarding the crop swath width is necessary. The swath width sensor of the present invention establishes this information. Thus, the disadvantages of conventional hectare counters—dependence on position of the header and unknown swath width, see U.S. Pat. No. 5,524,424 A—are avoided.

Preferably, the apparatus for collecting data is operable to establish a yield map. Thus, an additional crop parameter sensor measuring a parameter of the crop received (such as weight per time or moisture content) is delivered to the processor. From this data, the processor establishes a map representative of the parameter at several locations of the field. This parameter can be the weight of the received crop per area, which is calculated according to the measured received weight per time, the swath width and the speed or position of the agricultural machine. The area is calculated using the signals from the crop width measuring assembly. Hence, errors in the yield map due to unknown swath width—as described above—are avoided.

The signals from the crop presence sensors can also be used to determine whether crop is received at all, and thus yields information defining the start and end of the harvesting cycle. An accurate definition of when harvesting starts and stops is as important as measuring crop width in producing an accurate yield map. Unless at least one crop presence sensor indicates the presence of crop, the yield established by the processor is considered as zero.

The present invention can be used in any type of harvesting assembly used on any type of agricultural machine. Preferably, it is used on a combine, wherein the crop presence sensors are distributed over the active width of a cutter bar of the harvesting assembly for a combine. It could also be used in a forage harvester, the sensors distributed over the width of the forage harvester harvesting assembly. Use of the invention on other harvesting assemblies such as mowers and any other agricultural machine processing, receiving, taking up or harvesting crop is also possible.

BRIEF DESCRIPTION OF THE DRAWINGS

FIG. 2 is a top view of the harvesting assembly for the combine.

FIG. 3 is a cross sectional view of the harvesting assembly.

DETAILED DESCRIPTION

Figure 1:
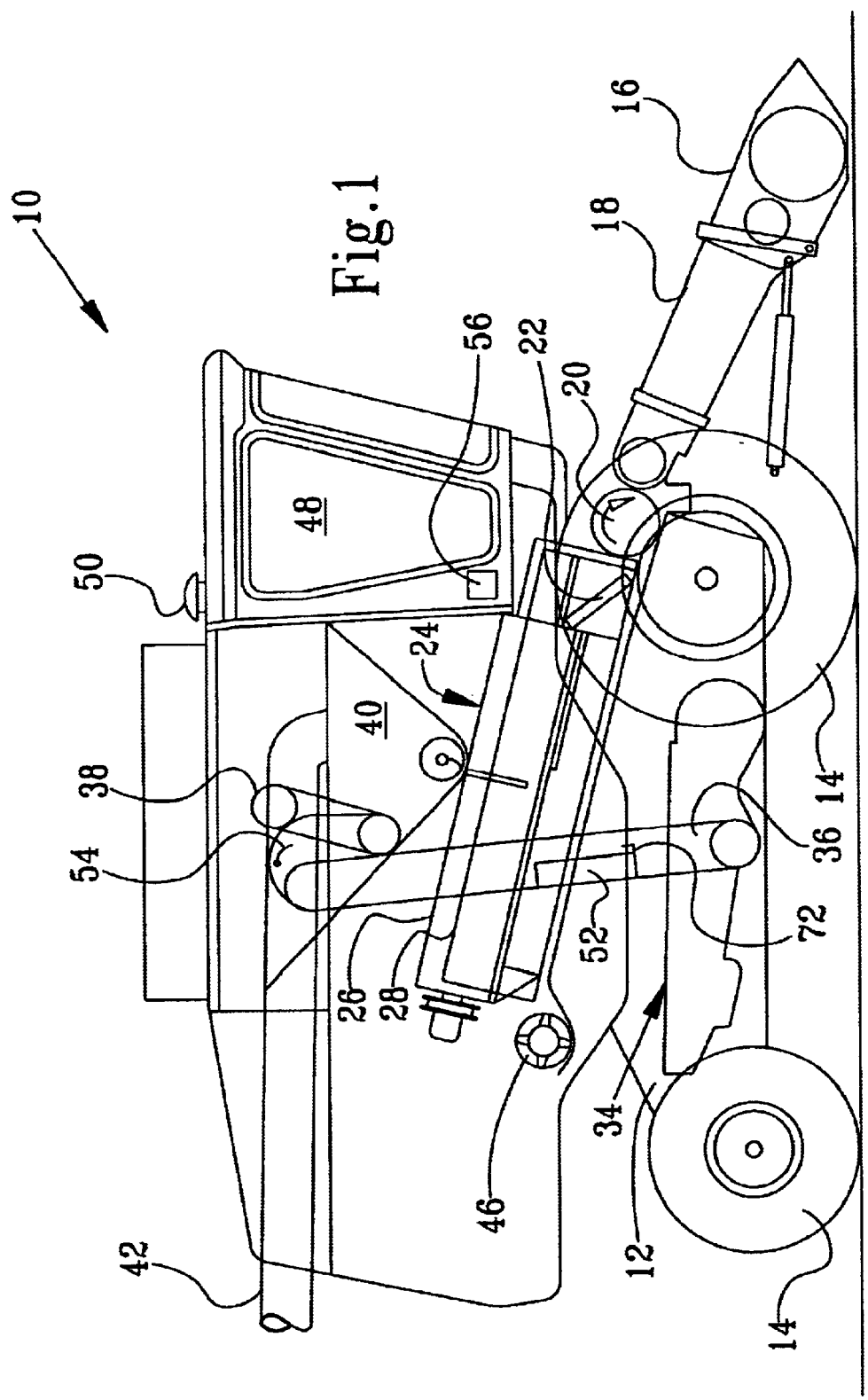
FIG. 1 is a semi-schematic side view of an agricultural combine.

FIG. 1 shows an agricultural combine 10 with a chassis 12 which is supported and propelled by ground engaging wheels 14. Although the combine 10 is illustrated as being supported and propelled on ground engaging wheels 14 it can also be supported and propelled by full tracks or half tracks. A harvesting assembly 16 is used to take up crop and to conduct it to a feederhouse 18. The crop is conducted by the feederhouse 18 to a beater 20. The beater 20 guides the crop upwardly through an intake transition region 22 to a rotary threshing and separating assembly 24. Although the invention is described in conjunction with a rotary combine, it can also be applied to other types of combines (for example conventional combines having a transverse threshing cylinder and straw walkers or combines having a transverse threshing cylinder and rotary separator rotors) or other agricultural machines. In addition, although the illustrated harvesting assembly is a harvesting platform the present invention can be used on other harvesting assemblies including flex cutterbar harvesting platforms, row crop headers, corn headers, pickup platforms and other harvesting assemblies.

The rotary threshing and separating assembly 24 comprises a rotor housing 26 and a rotor 28 arranged in the rotor housing 26. The harvested crop enters the rotor housing 26 through the intake transition region 22. The rotary threshing and separating assembly 24 threshes and separates the harvested crop. Grain and chaff fall through grates at the bottom of the rotor housing onto a cleaning assembly 34. The cleaning assembly 34 removes the chaff and conducts the clean grain to a grain elevator 36 which conducts upwardly to a distributing screw conveyor 38. The distributing screw conveyor 38 deposits the clean grain in a grain tank 40. The clean grain in the grain tank 40 can be unloaded through an unloading auger 42 into a trailer or truck. Threshed straw separated from the grain is conducted out of the rotary threshing and separating assembly 24 through an outlet to a discharge beater 46. The discharge beater 46 ejects the straw out the rear of the combine 10.

The operation of the combine 10 is controlled from an operator's cab 48. A geographic position sensor in the form of a receiver 50 for the reception of GPS signals (global positioning system) is attached above the operator's cab 48. Although it is at least in principle not necessary, when the accuracy of the receiver 50 is sufficient, a speed sensor measuring the speed of the wheels 14 can be provided. Mounted on one side of the clean grain elevator 36 is a capacitor moisture sensor 52 for measuring the moisture content of the clean grain. Such a sensor is disclosed in DE 199 34 881 A. A mass flow sensor 54 is located at the outlet of the clean grain elevator 36. The mass flow sensor 54 comprises an impeller plate mounted for rotation about a horizontal axis. Its deflection is dependent upon the mass flow rate of the clean grain. The deflection of the impeller plate is measured and thus data on the mass flow rate of the harvested grain is provided. Such a sensor is described in EP 0 853 234 A and the documents recited therein.

A processor 56 located in the operator's cab 48 (or somewhere else on the combine 10) is connected to the GPS receiver 50, the moisture sensor 52, the mass flow sensor 54, and the speed sensor, when present. The processor 56 is provided with an internal clock or receives external time signals, for example from the receiver 50. The processor 56 records the amount of harvested grain (measured by means of the mass flow sensor 54) and its moisture content (measured by means of the moisture sensor 52) dependent on the geographical position of the combine 10 (measured by means of the GPS receiver 50). The processor 56 logs the data and produces a field summary. Thus, it is possible to create a yield map with the logged data.

In order to reduce errors when generating the yield map, the harvesting assembly 16 is provided with a swath width sensing assembly, shown in FIG. 2. The swath width sensing assembly submits data to the processor 56, preferably by means of a bus, cables, optical fibers or electromagnetic waves. Thus, the actual width of the harvested swath is measured and considered when the yield map is generated. The processor 56 is informed when the swath of harvested crop is narrower than the active width of the header 16, which might happen at an end of a field, or when the combine 10 passes certain parts of a field a second time. The processor 56 is capable of calculating a correct yield, since the latter depends on the amount of harvested grain and on the area on which it was harvested. This area depends on the actual swath width measured by the swath width sensing assembly.

The harvesting assembly 16 comprises cutter bar 58 for cutting the crop and an auger 60 for feeding the cut crop to the center of harvesting assembly 16, where the harvested crop is fed into the feederhouse 18. The cutterbar 58 and the auger 60 are positioned between left and right side sheets 61. Crop dividers 62 are located at the front of the side sheets 61. The dividers 62 are driven into the crop splitting the crop sideways in front of the harvesting assembly 16 before it is cut by the cutter bar 58. The dividers 62 define the active width of the harvesting assembly. Although not shown, a conventional reel is usually located above the cutter bar 58.

The front of the harvesting assembly 16 behind the cutter bar 58 is provided with a number of crop presence sensors 64 for detecting the presence of crop. These sensors 64 are distributed along the width of the harvesting assembly 16. The crop presence sensors 64 submit data containing information whether crop is in their detection range (or not) to the processor 56. In the embodiment shown in FIG. 2, six crop presence sensors 64 are evenly distributed over the active width of the harvesting assembly 16. A swath of crop to be harvested is indicated with reference numeral 66. Since in FIG. 2 the two uppermost crop presence sensors 64 (the most left sensors in the forward moving direction of the harvesting assembly 16) are not within the swath width, they will provide the processor 56 with a signal indicating the lack of crop. The three crop presence sensors 64 shown in FIG. 2 below the two uppermost crop presence sensors 64 are within the swath width. Thus, they submit a signal to the processor 56 indicating that crop is presently harvested at their location. Finally, the lowermost crop presence sensor 64 shown at the bottom of FIG. 2 (the most right sensor in the forward moving direction of the header 16) is outside the swath width, as well, and submits a corresponding signal to the processor 56.

The crop presence sensors 64 distributed over the active width of the header 16 thus provide information on the actual width of the harvested crop swath to the processor 56. According to the information provided by the crop presence sensors 64, the processor 56 can determine the actual width of the swath 66. The processor 56 is also operable to detect whether harvesting is performed and thus whether crop is received at all (when at least one crop presence sensor 64 gives an information that crop is present) or not (when no crop presence sensor 64 submits data indicating that crop is present). Thus, a sensor for detecting if the harvesting assembly is raised or lowered is superfluous, and disadvantages of such sensors, as inaccuracy, are avoided.

In FIG. 3, a vertical cross sectional view of the harvesting assembly 16 is given. A crop presence sensor 64 is located at the rear end of the table 74 of the harvesting assembly 16. Sensor 64 is embedded into the surface of the table 74. An alternative position of a crop presence sensor is indicated with 64'. Crop presence sensor 64' is embedded into a stone ridge 76 at the forward end of the table 74, behind the cutterbar 58.

Figure 4:
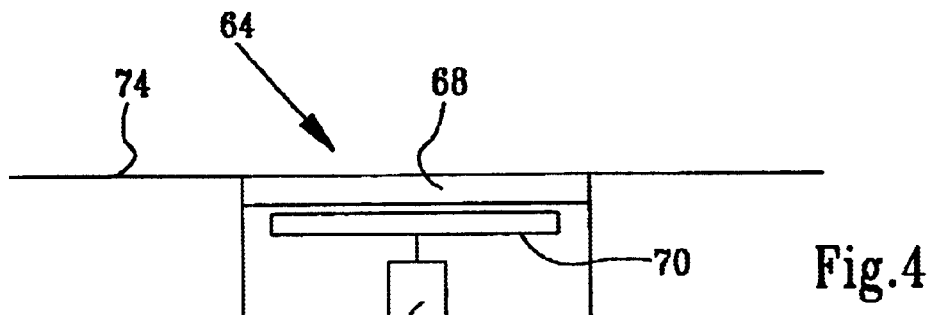
FIG. 4 is a cross sectional view of a crop presence sensor embedded into the table of the harvesting assembly.

Preferably, the crop presence sensors 64 are capacitive sensors. Such sensors are available from Carlo Gavazzi Industri A/S, Over Hadstenvej 38, 8370 Hadsten, Denmark, order number EC 5525PPAP. An embodiment of a capacitive crop presence sensor 64 is shown in more detail in FIG. 4. The crop presence sensor 64 is embedded into the upper surface of the table of the harvesting assembly 16. The crop presence sensor 64 comprises a conductive foil 70 or plate mounted below an insulating (but not necessarily transparent) window 68 lying in the plane of the upper surface of the table 74 of the harvesting assembly 16. The foil 70 is electrically connected to a signal processor 72. When crop is present above the window 68, the electric capacitance of the foil 70 measured against the header alters (increases). The signal processor 72 measures the electric capacitance of the foil 70. For example, the foil 70 is part of an electric resonance circuit, the resonance frequency of which is measured. Any other measurement of the capacitance is possible, as well. The signal processor 72 thus provides information regarding the presence of crop in the crop presence sensor's 64 vicinity to the processor 56.

In order to avoid crop resting on the window 68 from triggering the crop presence sensor 64, producing an error of the yield map, the crop presence sensor 64 is positioned on the table 74 of the harvesting assembly 16. Hence crop remaining on the window 68 is normally wiped away by harvested crop passing across the table 74. Alternatively or additionally, the output of the signal processor 72 is electrically processed removing the effect of any stationary material actuating the crop presence sensors 64. Thus, a time derivation of a value representing the electrical capacitance of foil 70 can be obtained and further processed.

Figure 5:
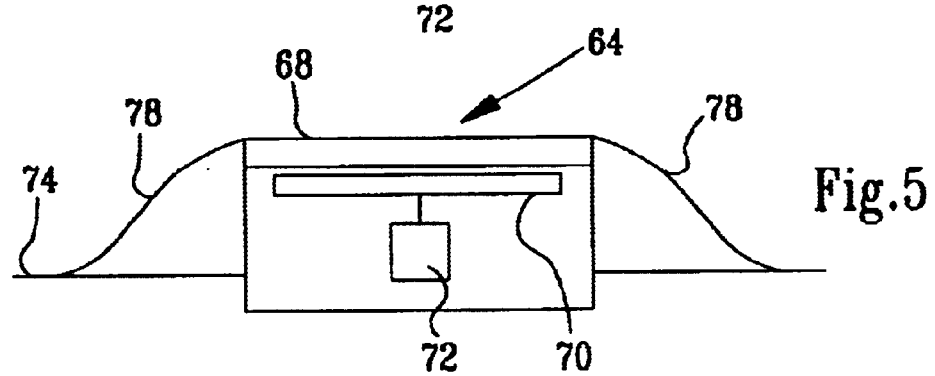
FIG. 5 is a cross sectional view of a crop presence sensor located above the upper surface of the table of the harvesting assembly.

In FIG. 5, another embodiment of a capacitive crop presence sensor 64 is given. It is located above the surface of the table 74 of the harvesting assembly. A ramp 78 in forward direction before and behind the crop presence sensor 64 keeps the surface of the crop presence sensor free of stationary material.

Figure 6:
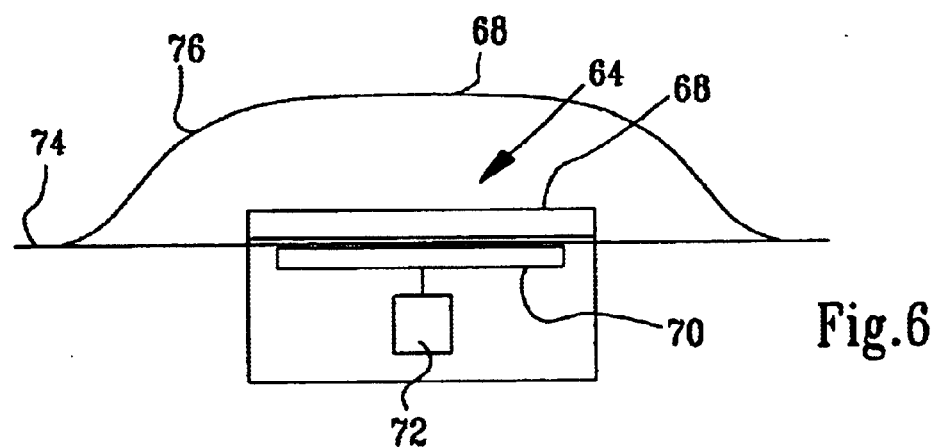
FIG. 6 is a cross sectional view of a crop presence sensor located below a stone ridge on the harvesting assembly.
Figure 7:
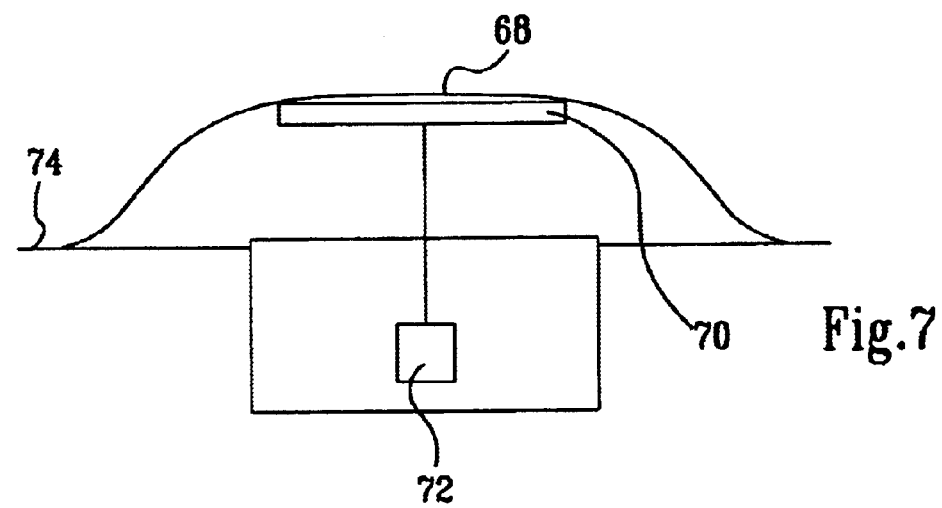
FIG. 7 is a cross sectional view of a crop presence sensor integrated into the stone ridge of the harvesting assembly.

FIG. 6 shows a third embodiment of a crop presence sensor 64, located below the stone ridge 76, and FIG. 7 represents a fourth embodiment of a crop presence sensor 64, integrated into the stone ridge 76, like the crop presence sensor 64' in FIG. 3. The elements of the crop presence sensors 64 of FIGS. 5 to 7 are the same as those of the sensor shown in FIG. 4.

Figure 8:
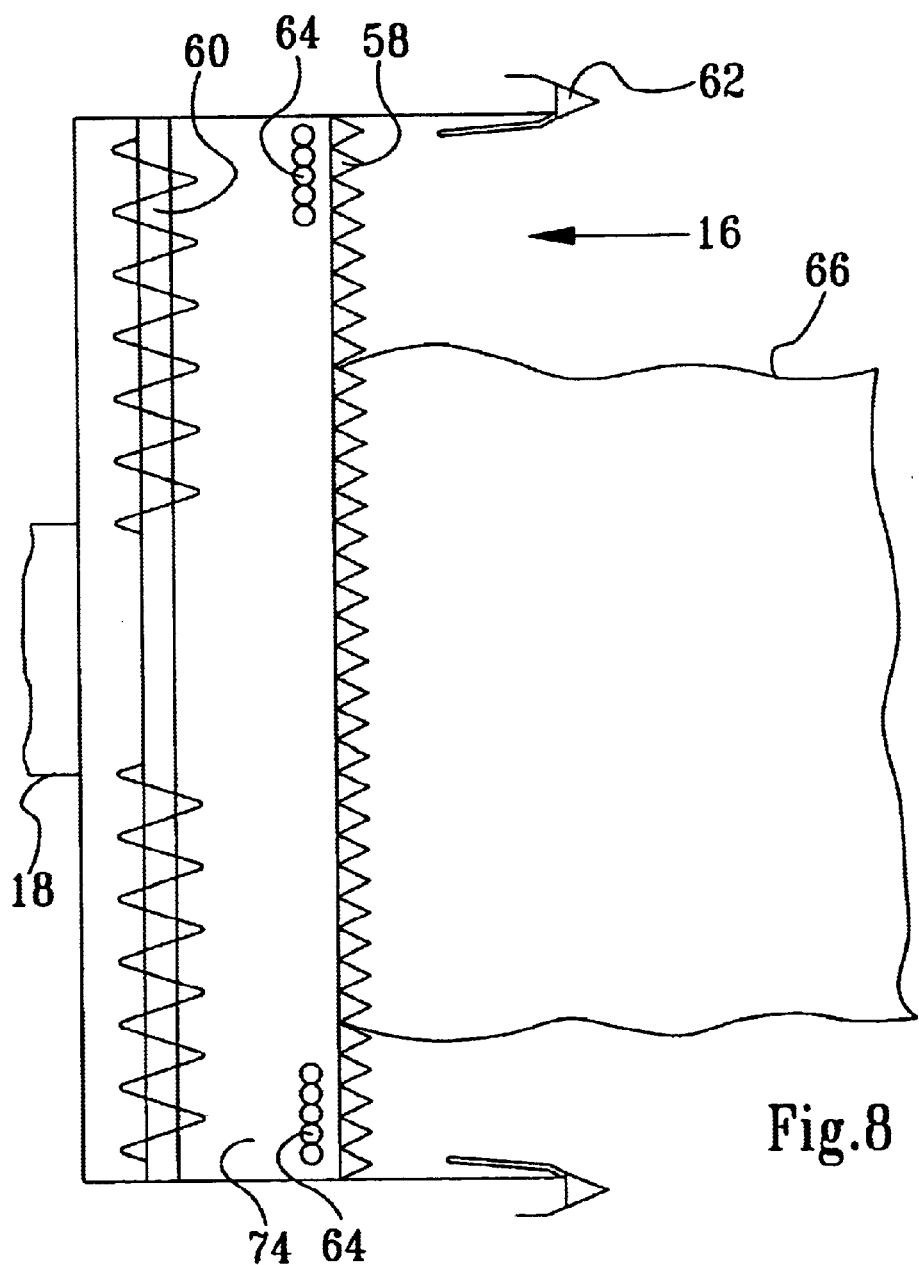
FIG. 8 is a top view of the harvesting assembly for the combine with another embodiment of crop presence sensors.

For either position 64 or 64' shown in FIG. 3, it is possible to make use of separate crop presence sensors 64 as indicated in FIG. 2. In another embodiment, shown in FIG. 8, two arrays of crop presence sensors 64 are provided. A first array of crop presence sensors 64 is placed at the left-hand edge of the table 74. A second (optional) array of crop presence sensors 64 is placed against the right-hand end of the table. This arrangement of sensors operates like the one disclosed in FIG. 2, except when the swath width does not cover the sensor array or arrays the processor 56 records the width as zero. Both arrays of crop presence sensors 64 preferably cover a width of 0.2 to 1.0 m. Software is used to insert the missing data on the yield map by interpreting between adjacent runs where the table was nearly full. Thus, the yield is known more accurately than with the embodiment of FIG. 2, although a similar number of crop sensors 64 is used.

Having described the preferred embodiment, it will become apparent that various modifications can be made without departing from the scope of the invention as defined in the accompanying claims.

What is claimed is:

1. A crop width measuring assembly for measuring the width of crop received by a harvesting assembly of an agricultural machine, the crop width measuring assembly comprising at least two crop presence sensors each having a detection range and providing data containing information whether crop is in their detection range, wherein the crop presence sensors are distributed over the width of the harvesting assembly, and at least one of the crop presence sensors is arranged such that moving harvested crop removes any stationary harvested crop from the crop presence sensor.

2. A crop width measuring assembly as defined by claim 1 wherein the harvesting assembly is provided with a table having a surface defining a plane, at least one of the crop presence sensors is located in the plane of the surface of the table.

3. A crop width measuring assembly as defined by claim 2 wherein at least one crop presence sensor is connected to a signal processor which electronically processes the signal of the crop presence sensor removing the effect of any stationary crop actuating the crop presence sensor.

4. A crop width measuring assembly as defined by claim 2 wherein at least one of the crop presence sensors is a capacitance sensor.

5. A crop width measuring assembly as defined by claim 1 wherein at least one crop presence sensor is connected to a signal processor which electronically processes the signal of the crop presence sensor removing the effect of any stationary crop actuating the crop presence sensor.

6. A crop width measuring assembly as defined by claim 5 wherein at least one of the crop presence sensors is a capacitance sensor.

7. A crop width measuring assembly as defined by claim 1 wherein at least one of the crop presence sensors is a capacitance sensor.

8. A crop width measuring assembly as defined by claim 1 wherein the crop presence sensors are in communication with a processor, the processor being coupled to a geographic position sensor for monitoring the geographic position of the agricultural machine in a field, wherein the processor is operable to establish a value which is dependent on the geographic position of the agricultural machine and the crop width being harvested.

9. A crop width measuring assembly as defined by claim 8 wherein the processor is coupled to an additional sensor sensing an additional crop parameter so that processor can map the additional crop parameter in relation to its geographic position in the field.

10. A crop width measuring assembly as defined by claim 9 wherein the processor determines according to the signal of the crop presence sensors whether crop is being received by the harvesting assembly.

11. A crop width measuring assembly as defined by claim 8 wherein the processor determines according to the signal of the crop presence sensors whether crop is being received by the harvesting assembly.

* * * * *